(12) United States Patent
Teraji et al.

(10) Patent No.: US 7,668,640 B2
(45) Date of Patent: Feb. 23, 2010

(54) CYLINDER DIRECT INJECTION TYPE INTERNAL COMBUSTION ENGINE

(75) Inventors: Atsushi Teraji, Yokohama (JP); Toru Noda, Yokohama (JP); Daisuke Tanaka, Yokosuka (JP)

(73) Assignee: Nissan Motor Co., LTD., Yokohama-shi, Kanagawa (JP)

( * ) Notice: Subject to any disclaimer, the term of this patent is extended or adjusted under 35 U.S.C. 154(b) by 70 days.

(21) Appl. No.: 11/978,638

(22) Filed: Oct. 30, 2007

(65) Prior Publication Data

US 2008/0103678 A1  May 1, 2008

(30) Foreign Application Priority Data

Oct. 31, 2006  (JP) .............................. 2006-295051

(51) Int. Cl.
*F02D 41/30* (2006.01)
(52) U.S. Cl. ................... 701/103; 123/27 R; 123/299
(58) Field of Classification Search ......... 701/101–104; 123/299, 300, 305, 1 A, 3, 198 DA, 557, 123/558, 276, 304, 316, 27 R, 78 E, 78 F, 123/525, 526
See application file for complete search history.

(56) References Cited

U.S. PATENT DOCUMENTS

| | | | | |
|---|---|---|---|---|
| 4,254,741 A | | 3/1981 | Werling et al. | |
| 4,453,502 A | * | 6/1984 | Resler, Jr. | 123/430 |
| 5,050,550 A | | 9/1991 | Gao | |
| 6,227,151 B1 | | 5/2001 | Ma | |
| 6,332,448 B1 | * | 12/2001 | Ilyama et al. | 123/304 |
| 6,711,893 B2 | * | 3/2004 | Ueda et al. | 60/285 |
| 6,972,093 B2 | * | 12/2005 | Partridge et al. | 210/321.6 |
| 7,013,844 B2 | * | 3/2006 | Oda | 123/3 |
| 7,013,861 B1 | * | 3/2006 | Hutmacher et al. | 123/276 |
| 7,040,279 B2 | * | 5/2006 | Regueiro | 123/254 |
| 7,188,607 B2 | * | 3/2007 | Kobayashi | 123/431 |
| 7,284,506 B1 | * | 10/2007 | Sun et al. | 123/1 A |
| 7,320,297 B2 | * | 1/2008 | Kamio et al. | 123/1 A |

FOREIGN PATENT DOCUMENTS

| | | |
|---|---|---|
| EP | 1 378 644 B1 | 5/2006 |
| GB | 2 327 980 | 2/1999 |
| JP | 2005-139945 | 6/2005 |

* cited by examiner

*Primary Examiner*—Stephen K Cronin
*Assistant Examiner*—Johnny H Hoang
(74) *Attorney, Agent, or Firm*—Drinker Biddle & Reath LLP

(57) ABSTRACT

A cylinder direct injection type internal combustion engine, including a fuel injection device configured to directly inject a first octane-value fuel and a second octane-value fuel into a combustion chamber. The second octane-value fuel has an octane value larger than an octane value of the first octane-value fuel. A controller is programmed to perform a first operation mode. In the first operation mode, the first octane-value fuel is injected from the fuel injection device, and the second octane-value fuel is injected from the fuel injection device toward an ignition flame formed by self-ignition combustion of the first octane-value fuel, so as to cause flame propagation and combustion of the second octane-value fuel.

16 Claims, 16 Drawing Sheets

FIG. 10
a) INJECTION OF HIGH-OCTANE FUEL IN CAVITY
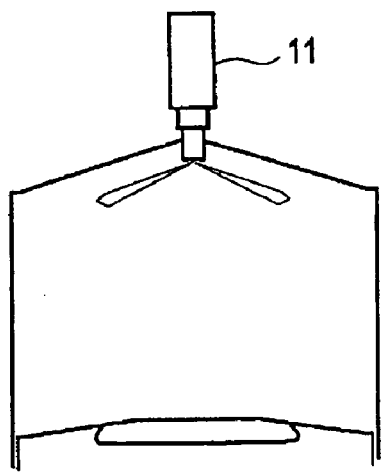
↑ PISTON MOTION
a) INJECTION OF HIGH-OCTANE FUEL IN CAVITY
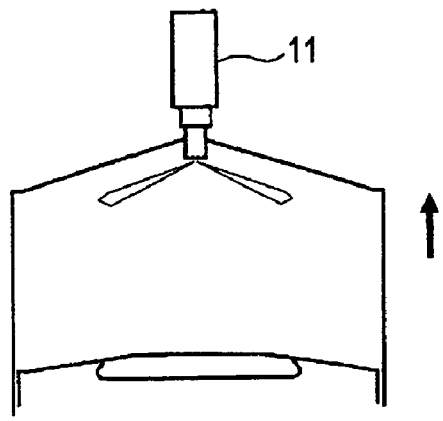
b) FORMATION OF UNIFORM AIR-FUEL MIXTURE DISTRIBUTION
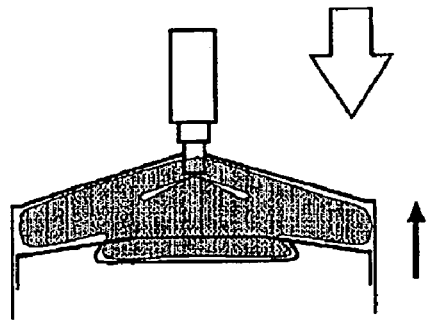
b) FORMATION OF UNIFORM AIR-FUEL MIXTURE DISTRIBUTION
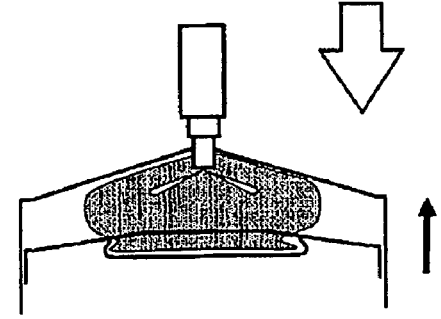
c) START OF INJECTION AND COMBUSTION OF LOW-OCTANE FUEL
c) START OF INJECTION AND COMBUSTION OF LOW-OCTANE FUEL (a) INJECTION OF LOW-OCTANE FUEL INTO CAVITY (b) IGNITION (c) INJECTION OF HIGH-OCTANE FUEL (d) FLAME STANDING

POSITION AT
HIGH COMPRESSION RATIO

POSITION AT
LOW COMPRESSION RATIO (a) INJECTION OF LOW-OCTANE FUEL INTO CAVITY (b) IGNITION (c) INJECTION OF HIGH-OCTANE FUEL (d) FLAME STANDING

CYLINDER DIRECT INJECTION TYPE INTERNAL COMBUSTION ENGINE

CROSS-REFERENCE TO RELATED APPLICATIONS

This application claims priority under 35 U.S.C. §119 to Japanese Patent Application No. 2006-295051, filed on Oct. 31, 2006, the disclosure of which is incorporated by reference herein in its entirety.

BACKGROUND OF THE INVENTION

1. Field of the Invention

The present invention relates to a cylinder direct injection type internal combustion engine using two kinds of fuels that are different in ignitability.

2. Description of Related Art

A related art internal combustion engine uses low-octane fuel (high-cetane fuel) having a high self-ignitability and high-octane fuel having a high resistance to knocking. During a low-load operation, stable self-ignition combustion (lean combustion) is achieved by increasing the supply ratio of low-octane fuel. In contrast, during a high-load operation, pre-ignition is prevented by increasing the supply ratio of high-octane fuel. When two kinds of fuels are injected, a region where the fuel concentration is high (rich region) is formed, and an increase in combustion temperature in the region increases the amount of NOx emission. Moreover, the amount of smoke emission is increased by a shortage of air in the region. In order to solve these problems, low-octane fuel is injected toward the center of a combustion chamber and high-octane fuel is injected toward the periphery of the combustion chamber so that the low-octane fuel and the high-octane fuel are not mixed in the combustion chamber.

However, even when two kinds of fuels that are different in ignitability are separately injected toward the center and the periphery of the combustion chamber, as in the related art, the fuels need to be close to each other so that combustion is continuously performed, and it is difficult to completely separate the fuels. Since a rich region is inevitably formed, it is difficult to reduce the amount of NOx emission.

BRIEF SUMMARY OF THE INVENTION

In view of these circumstances, it is an object of the present invention to improve an injection method for two kinds of fuels that are different in ignitability (e.g. a low-octane fuel having a relatively high self-ignitability, and a high-octane fuel having a relatively low self-ignitability) for the purpose of stable combustion of the two kinds of fuels.

In order to achieve the above object, an ignition flame of a low-octane fuel is formed in a combustion chamber by injecting the low-octane fuel earlier than a high-octane fuel, and the high-octane fuel is then injected toward the ignition flame.

In this case, an ignition flame is formed by injecting low-octane fuel earlier, and high-octane fuel is burned by being injected toward the ignition flame. Therefore, the injected high-octane fuel is immediately burned, and two-kinds of fuels that are different in ignitability are burned continuously. This can reduce the HC amount. Further, since the fuels are injected at different times, a rich region is not formed, and the amount of NOx emission is reduced.

In an embodiment, the invention provides a cylinder direct injection type internal combustion engine, including a fuel injection device configured to directly inject a first octane-value fuel and a second octane-value fuel into a combustion chamber. The second octane-value fuel has an octane value larger than an octane value of the first octane-value fuel. A controller is programmed to perform a first operation mode. In the first operation mode, the first octane-value fuel is injected from the fuel injection device, and the second octane-value fuel is injected from the fuel injection device toward an ignition flame formed by self-ignition combustion of the first octane-value fuel, so as to cause flame propagation and combustion of the second octane-value fuel.

In another embodiment, the invention provides a fuel injection control method for a cylinder direct injection type internal combustion engine, the engine including a fuel injection device configured to directly inject a first octane-value fuel and a second octane-value fuel into a combustion chamber. The method includes injecting the first octane-value fuel from the fuel injection device, forming an ignition flame in the combustion chamber by self-ignition combustion of the first octane-value fuel, injecting the second octane-value fuel from the fuel injection device toward the ignition flame of the first octane-value fuel, and causing flame propagation and combustion of the second octane-value fuel.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 10 includes explanatory views showing fuel behavior and flame propagation in the cylinder under a high-load operating condition;

DETAILED DESCRIPTION OF THE PREFERRED EMBODIMENTS

Embodiments of the present invention will be described below with reference to the drawings.

First, a first embodiment of the present invention will be described.

Figure 1:
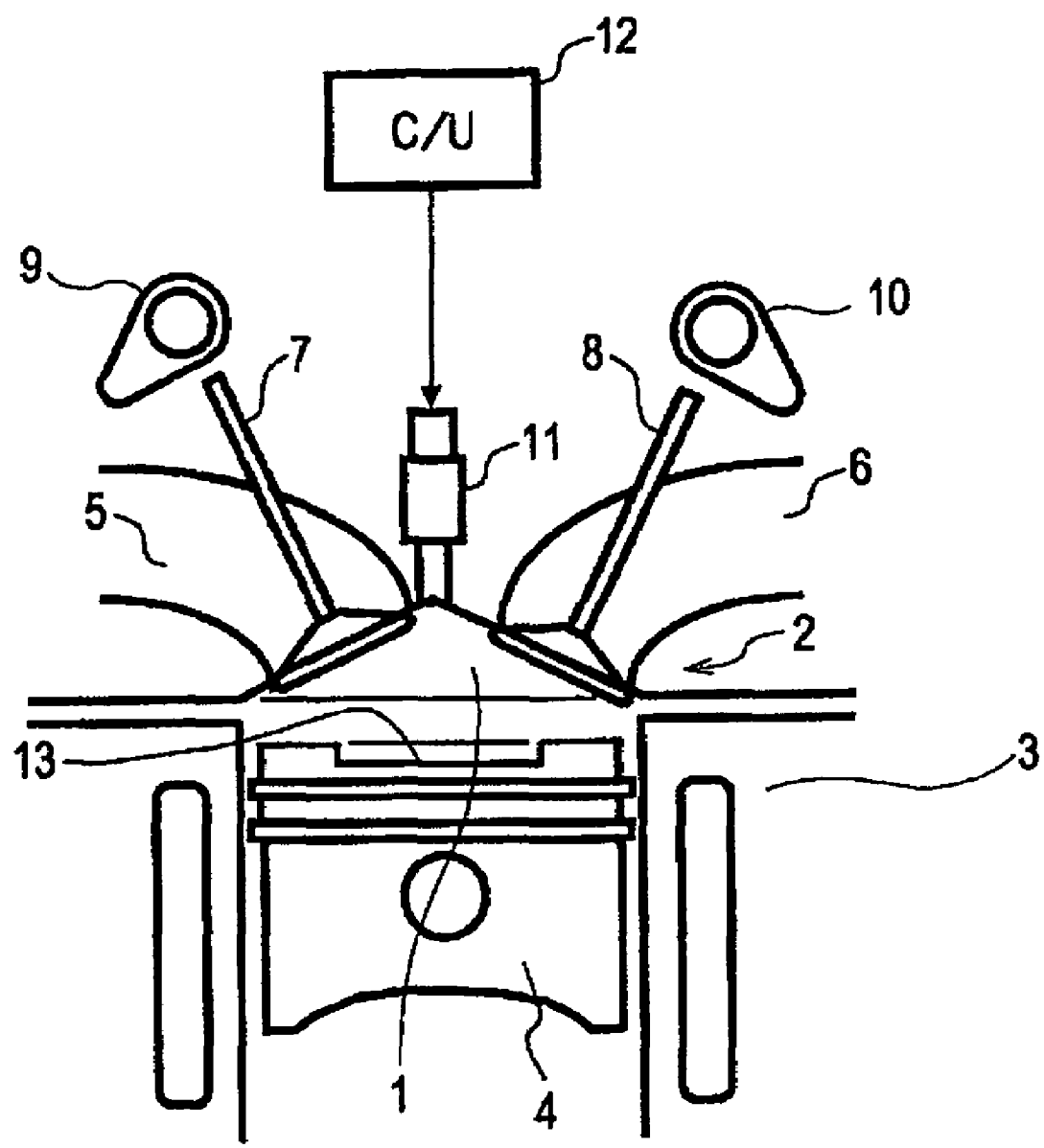
FIG. 1 is a front view of an internal combustion engine according to a first embodiment.
Figure 2:
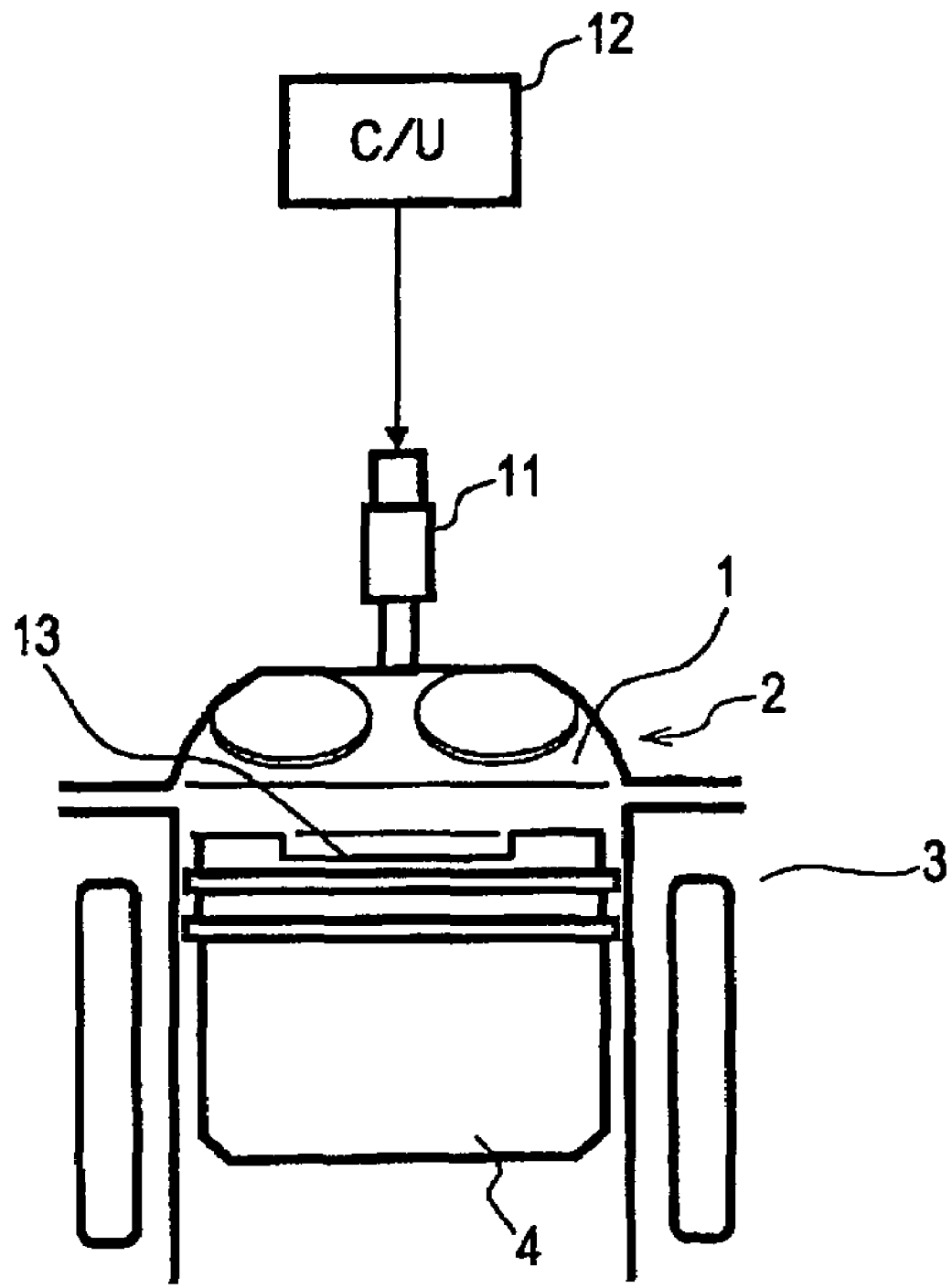
FIG. 2 is a side view of the internal combustion engine.

FIGS. 1 and 2 are front and side views, respectively, of an internal combustion engine according to the first embodiment.

The internal combustion engine includes a combustion chamber 1, a cylinder head 2, a cylinder block 3, and a piston 4 that define the combustion chamber 1, an intake port 5, an exhaust port 6, an intake valve 7, an exhaust valve 8, an intake-valve cam 9, an exhaust-valve cam 10, and a fuel injection valve 11. In the internal combustion engine, fuel injection is performed according to signals from an engine control unit 12.

A cavity 13 is provided in the center of a crown surface of the piston 4. The fuel injection valve 11, which may be a part of a fuel injection device, is formed by a multi-hole injection valve. While the fuel injection valve 11 may be an outward-opening injection valve or a swirl injection valve, the average equivalence ratio of spray in cross section should be set to be less than or equal to about 2. The supply velocity and the combustion speed (i.e. flame propagation velocity) of an air-fuel mixture supplied from the fuel injection valve 11 are balanced so that the flame stands still in the combustion chamber 1.

The fuel injection valve 11 can inject low-octane fuel (high-cetane fuel) and high-octane fuel. A specific configuration of the fuel injection valve 11 will be described with reference to FIG. 3. As used herein, a low-octane fuel may also be referred to as a "first octane-value fuel" and a high-octane fuel may also be referred to as a "second octane-value fuel."

Figure 3:
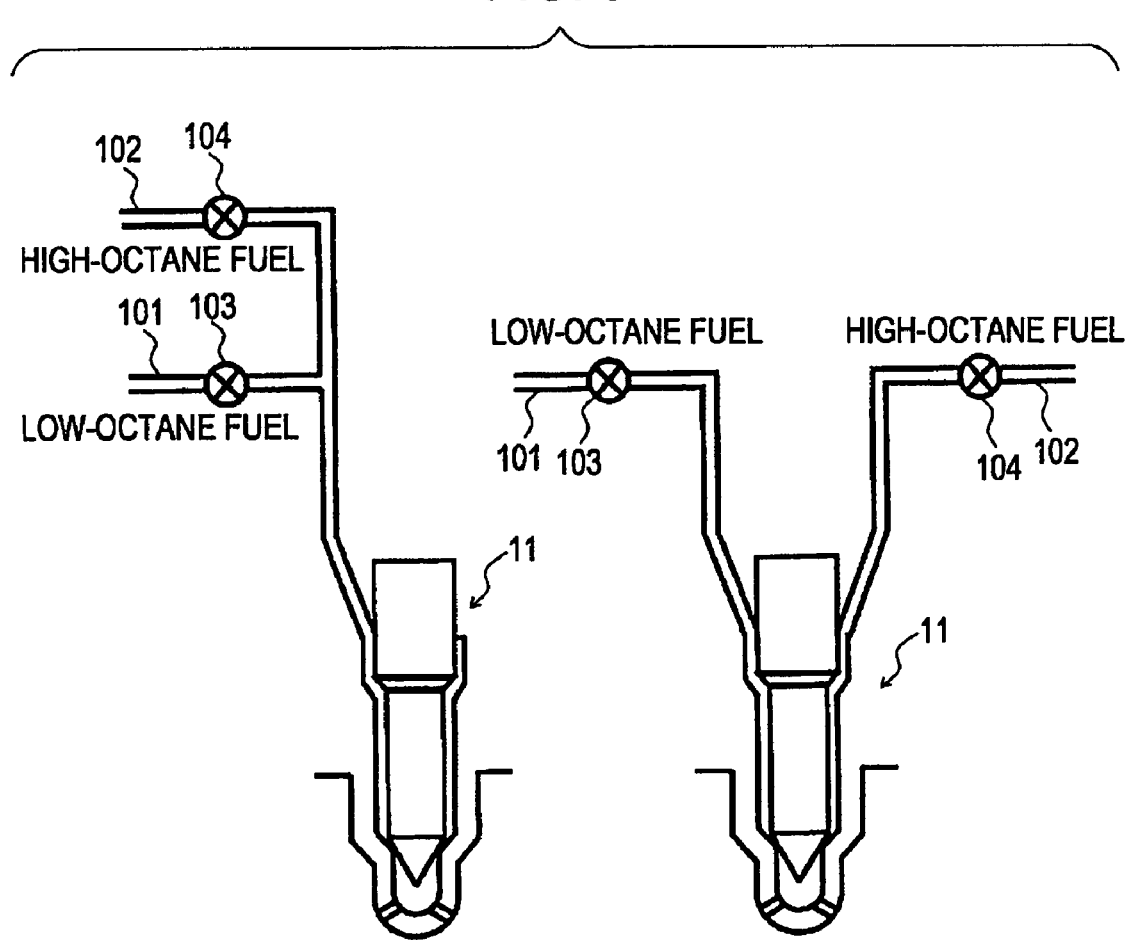
FIG. 3 is a view of a fuel injection device in the first embodiment.

Referring to FIG. 3, the fuel injection device includes the fuel injection valve 11, a fuel pipe 101 for low-octane fuel, and a fuel pipe 102 for high-octane fuel. The fuel pipes 101 and 102 are respectively provided with control valves 103 and 104. The opening and closing timing of the control valves 103 and 104 can be controlled by the engine control unit 12. By opening or closing the control valves 103 and 104 in accordance with the injection timing, two kinds of fuel can be selectively injected from the single fuel injection valve 11. Both right and left configurations shown in FIG. 3 provide similar advantages.

When low-octane fuel is injected earlier than high-octane fuel during a low-load operation, the control valve 103 of the low-octane fuel pipe 101 is first opened, and low-octane fuel is injected. Subsequently, the control valve 103 is closed, and the control valve 104 of the high-octane fuel pipe 102 is opened so as to inject high-octane fuel.

When low-octane fuel is injected later than high-octane fuel during a high-load operation, the control valve 104 of the high-octane fuel pipe 102 is first opened, and high-octane fuel is injected. Subsequently, the control valve 104 is closed, and the control valve 103 of the low-octane fuel pipe 101 is opened so as to inject low-octane fuel.

Figure 4:
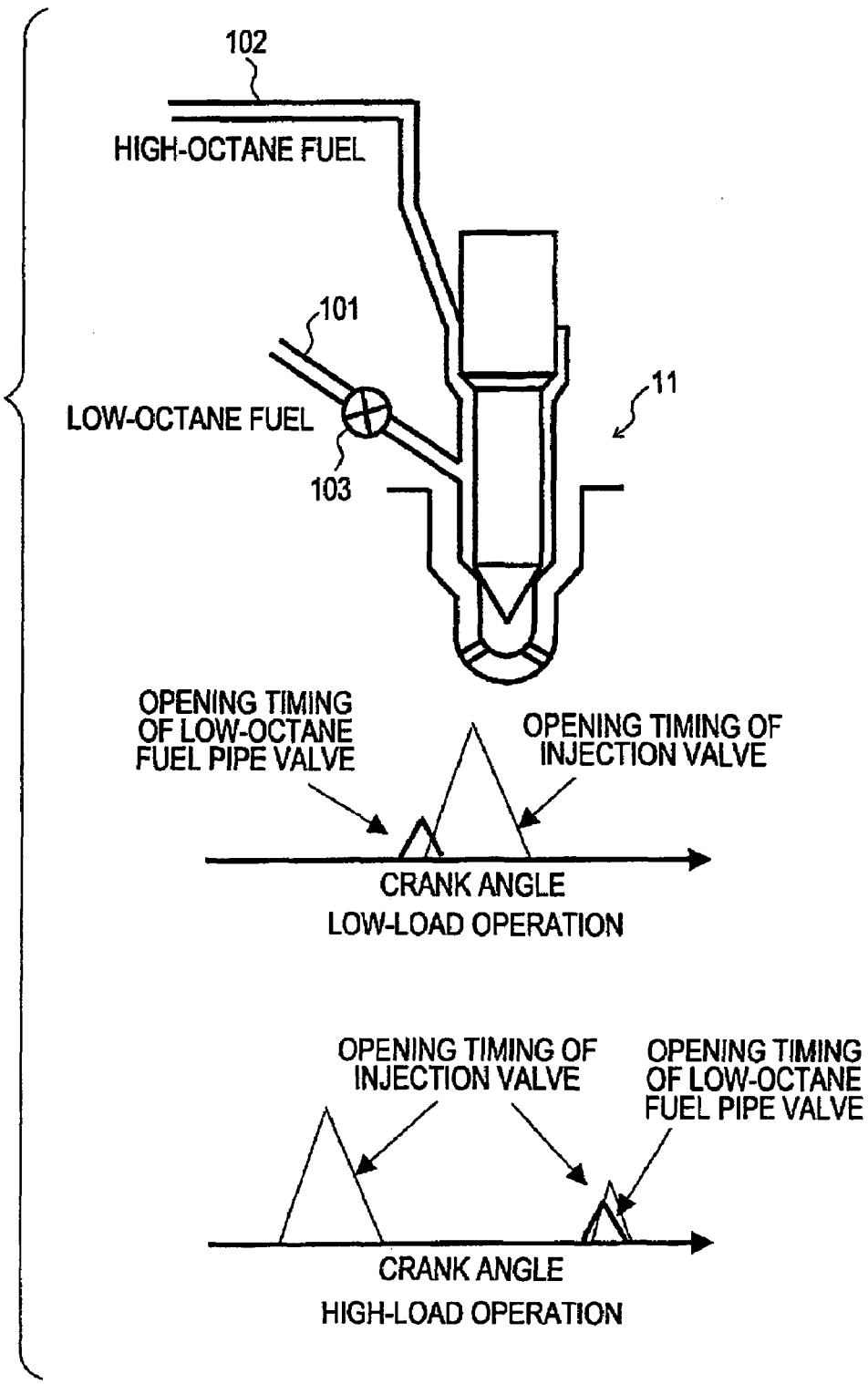
FIG. 4 is another view of the fuel injection device in the first embodiment.

FIG. 4 shows another example configuration of the fuel injection device in the first embodiment. A fuel injection device shown in FIG. 4 includes a fuel injection valve 11, a fuel pipe 101 for low-octane fuel, and a fuel pipe 102 for high-octane fuel. Only the low-octane fuel pipe 101 is provided with a control valve 103 whose opening and closing timing are controllable by the engine control unit 12. By opening or closing the control valve 103 in accordance with the injection timing, two kinds of fuel can be selectively injected from the single fuel injection valve 11.

When low-octane fuel is injected earlier than high-octane fuel during a low-load operation, the control valve 103 of the low-octane fuel pipe 101 is opened earlier than the opening timing of the fuel injection valve 11, and is closed with some overlap with the opening timing of the fuel injection valve 11. Although the low-octane fuel and the high-octane fuel are slightly mixed in this case, this does not cause a problem because the low-octane fuel has a high self-ignitability.

When low-octane fuel is injected later than high-octane fuel during a high-load operation, the fuel injection valve 11 is opened while the control valve 103 of the low-octane fuel pipe 101 is closed, so that a combustible air-fuel mixture of high-octane fuel is formed in the cylinder. After the combustible air-fuel mixture is formed, the fuel injection valve 11 is opened again. Prior to this opening timing of the fuel injection valve 11, the control valve 103 is opened to inject low-octane fuel into the cylinder.

Figure 5:
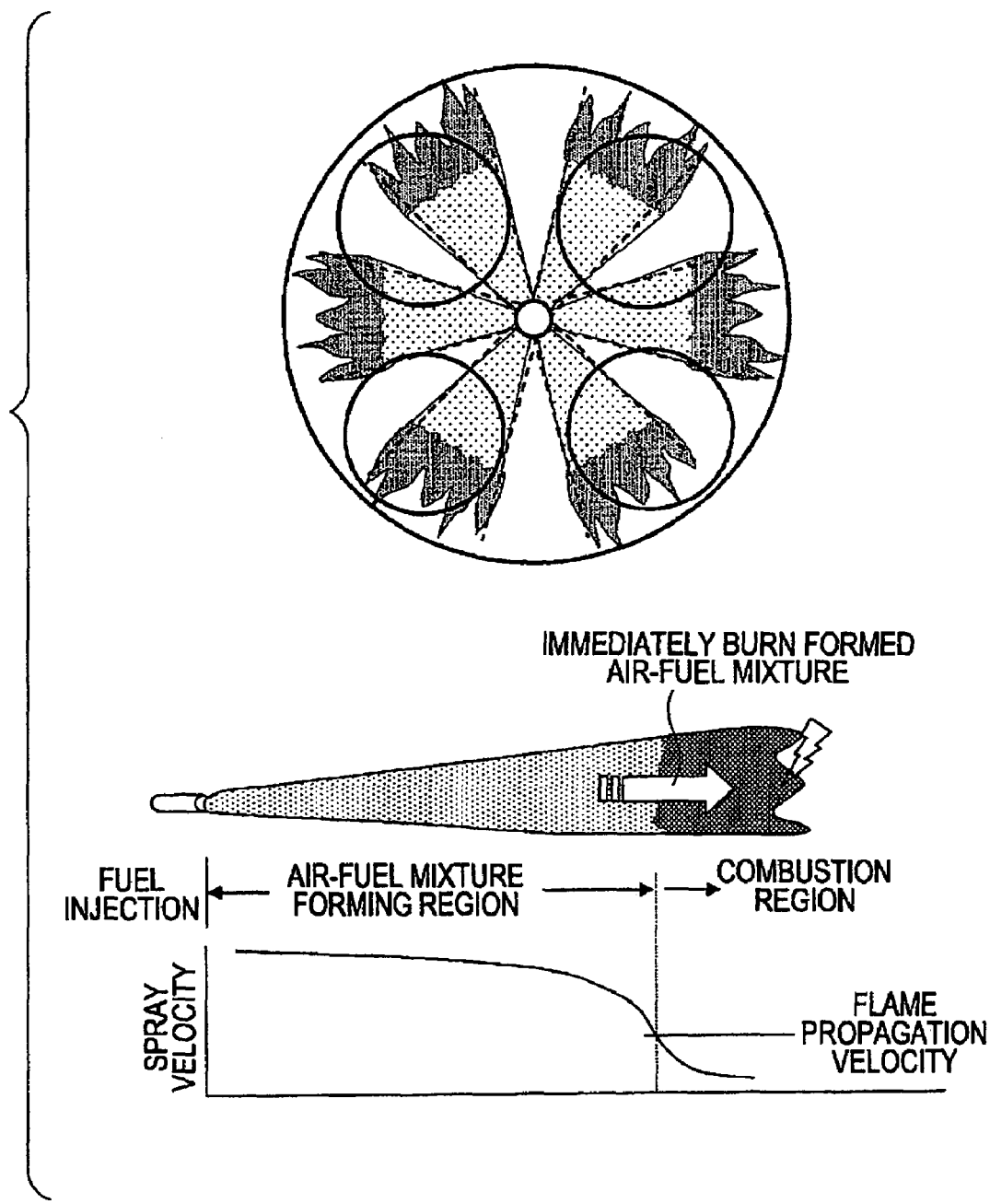
FIG. 5 is an explanatory view showing fuel behavior and standing flames in a cylinder under a low-load operating condition.

With reference to FIG. 5, a description will be given of the outline of fuel behavior and standing flames in the cylinder under a low-load operating condition according to the present invention.

Low-octane fuel having a high self-ignitability is first injected from the fuel injection valve. Successively following the injection of low-octane fuel, high-octane fuel is injected.

The high-octane fuel injected later is atomized and evaporated while taking in high-temperature ambient air, thereby forming a combustible air-fuel mixture. The combustible air-fuel mixture formed by the high-octane fuel starts to be burned by a flame that is generated by self-ignition combustion of the low-octane fuel injected earlier. Subsequently, the flame grows and propagates upstream of the spray fuel.

In the present invention, the average flow velocity of the spray (i.e. spray velocity) and the combustion velocity of the flame (i.e. flame propagation velocity) are balanced, so that a flame front is formed in the spray and subsequently stands still. The average equivalence ratio of the combustible air-fuel mixture at the flame front is set at about two or less. This ratio prevents generation of harmful exhaust components such as smoke and CO.

By immediately burning the generated air-fuel mixture, as described above, spray combustion can be performed without forming an unburnt air-fuel mixture.

Since the combustion velocity varies according to the pressure, temperature, disturbance, and concentration of the air-fuel mixture, the position (i.e. distance) where the flame stands still varies in accordance with the change in the ambient condition in the cylinder. However, the combustion flame does not need to stand at a fixed position through a combustion period, but should be within a range that satisfies the above-described condition.

Formation and combustion of an air-fuel mixture will be described with reference to FIGS. 6A to 6D as schematic views.

In this embodiment, low-octane fuel is sprayed into the cavity in the early stage of injection so as to form an ignition air-fuel mixture in the cavity, as shown in FIG. 6A. The low-octane fuel is injected at the timing that allows the fuel to be reliably injected into the cavity in the late stage of a compression stroke.

Ignition pilot injection for ignition spray and subsequent main injection for main spray can be performed continuously.

Alternatively, divided injection can be performed by forming a difference between the timing of ignition pilot injection and the timing of main injection so that at least a part of fuel injected by ignition pilot injection is directed to the cavity.

Then, a high temperature field is formed by self-ignition combustion of the low-octane fuel injected in the cavity, as shown in FIG. 6B. FIGS. 6A and 6B show the compression stroke (i.e. upward movement of the piston).

Figure 7:
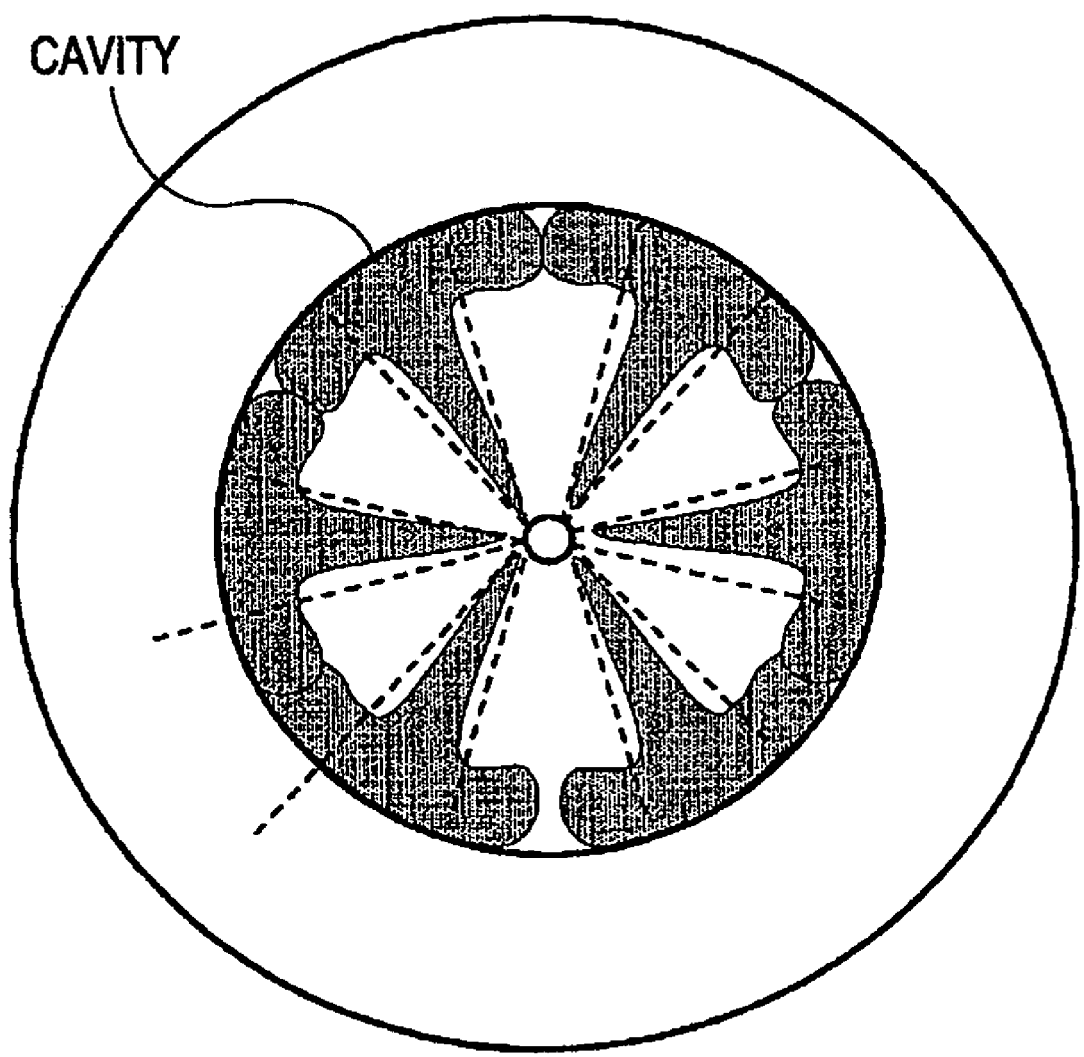
FIG. 7 is a plan view of a piston crown surface, showing a state in which low-octane fuel collides with a cavity.

As shown in FIG. 7, the air-fuel mixture collides with the wall of the cavity and is thereby diffused, and its flow velocity decreases. Therefore, stable ignition can be performed even when the distance between the injection port and the cavity is short.

In addition, the air-fuel mixture colliding with the wall of the cavity spreads in a substantially annular shape near an inner wall of a piston bowl. However, since the low-octane fuel has a high self-ignitability and starts to be burned, an annular-shaped high-temperature field can be formed.

Figure 8:
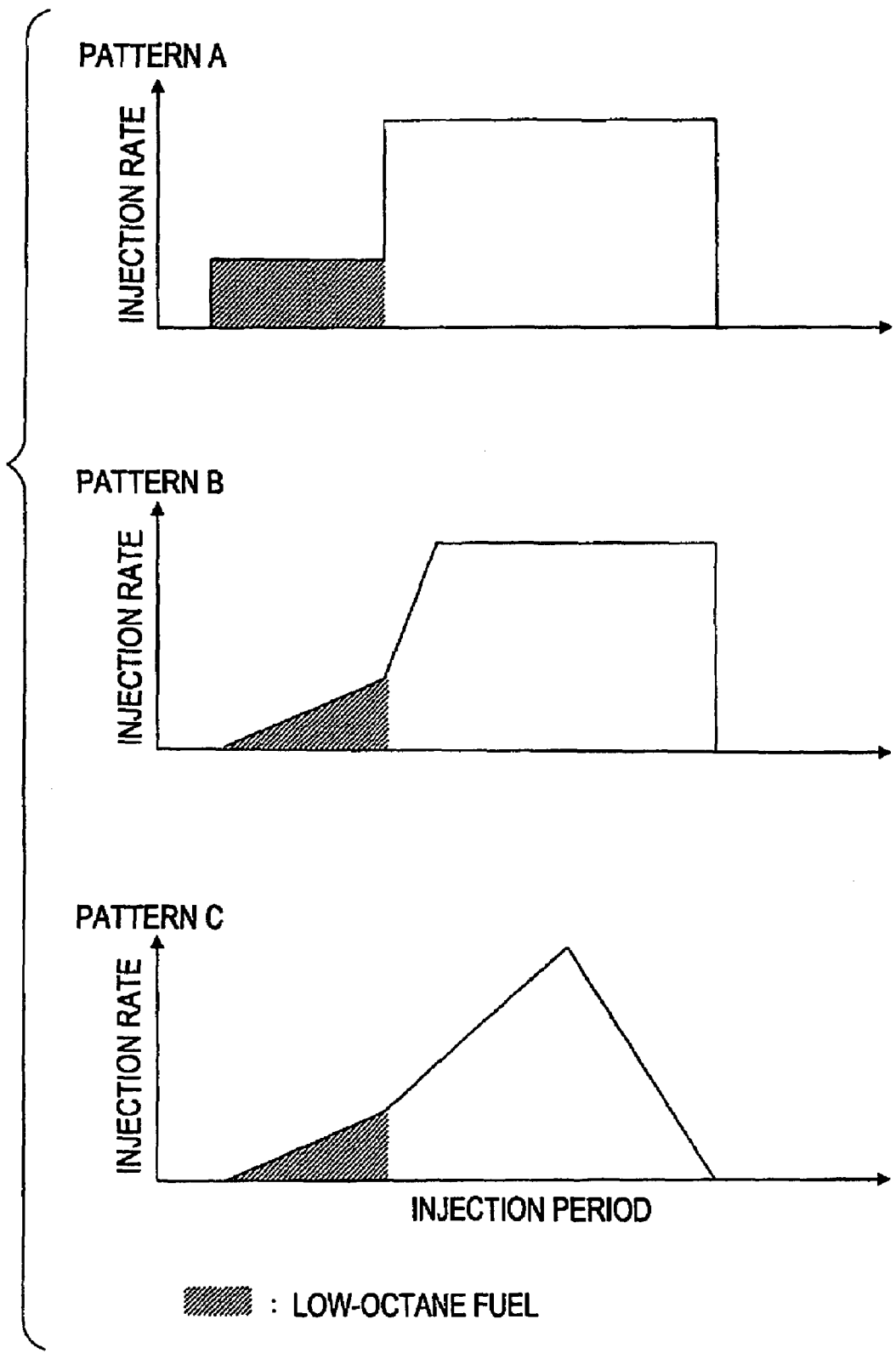
FIG. 8 is an exemplary view showing injection patterns in which an injection period includes a low injection rate section.

As shown in FIG. 8, ignition pilot injection directed toward the cavity is performed in a period in which the injection quantity is small (i.e. a low injection-rate period), and the low-octane fuel is injected in this period. Since this can reduce the amount of fuel injected toward the cavity, the size of the cavity can be decreased, and adhesion of fuel on the wall of the cavity and the increase of smoke due to an excessively dense air-fuel mixture can be avoided. As a result, the capacity of the cavity decreases, which improves the S/V ratio of the combustion chamber and reduces cooling loss. Moreover, the mechanical compression ratio of the engine can be increased. Further, injection of an excessive amount of low-octane fuel can be suppressed, which also provides an advantage in fuel consumption.

Referring to FIG. 6C, fuel injection for main spray is performed subsequently to the above-described ignition pilot injection. Fuel for main injection is injected outside the cavity, and a wide range of injection directions are designed so that the piston and the spray onto the upper wall of the combustion chamber do not interfere with the main injection.

From the above, it is possible to make full use of air in the combustion chamber. The ignition flame formed in the cavity whirls above the cavity because of a circulation flow formed by the kinetic momentum of the spray and the guide effect of the piston bowl. Consequently, an air-fuel mixture formed by main injection directed outside the cavity can be reliably ignited and subsequently burned.

Figure 9:
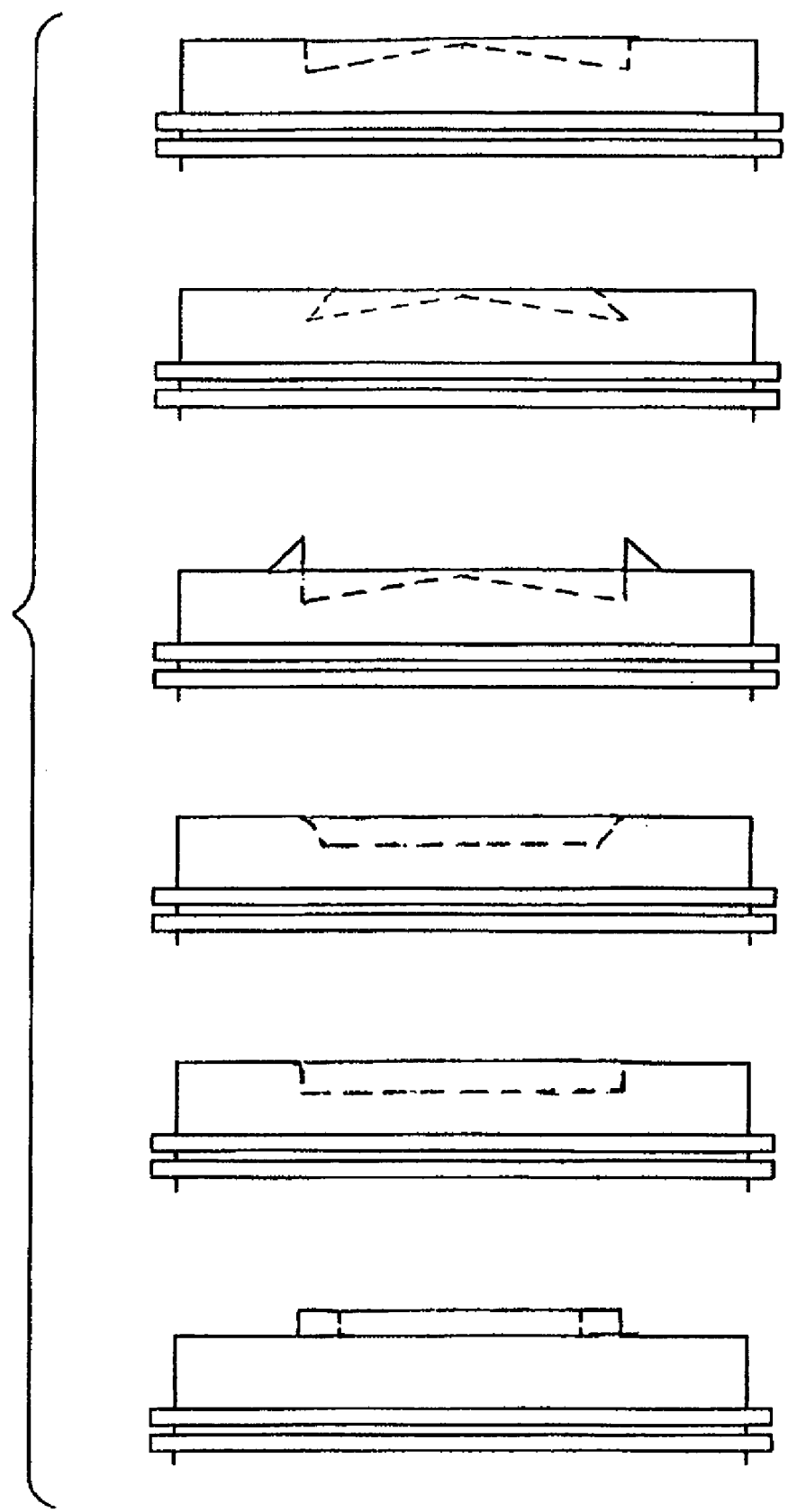
FIG. 9 includes schematic views showing shape examples of cavities that form an ignition air-fuel mixture.

FIG. 9 shows example shapes of the cavity of the piston. In contrast to the normal shape, an inverse squish effect is enhanced by a reentrant shape, and the ignition flame flows out of the cavity by the inverse squish effect. The cavity may be shaped such that the cavity wall is open outward, or may have any shape that provides an effect of positively leading the air-fuel mixture outside the cavity.

As a result, the ignition flame formed in the cavity by the spray kinetic momentum and flow intersects the direction in which the high-octane fuel is sprayed. This enables reliable ignition of main spray.

Referring to FIG. 6D, main fuel flow enters the ignition flame formed in the cavity, and is substantially simultaneously ignited. Consequently, the combustion flame of main spray immediately burns the formed air-fuel mixture, and stands still in the combustion chamber. FIGS. 6C and 6D show an expansion stroke (i.e. downward movement of the piston).

With reference to FIG. 10, a description will now be given of the outline of flame behavior and propagation in the cylinder under a high-load operating condition. Left views in FIG. 10 show a case in which the load is relatively high.

High-octane fuel injected from the fuel injection valve forms a uniform distribution of a combustible air-fuel mixture in the cylinder. In this case, pumping loss is reduced by stratifying the high-octane fuel according to the operating load condition (right views (a) and (b) in FIG. 10). When low-octane fuel is then injected near the top dead center, it achieves self-ignition combustion, so that normal flame propagation and combustion of the high-octane fuel is started. Since the high-octane fuel is dominant in the cylinder, combustion can be performed without knocking and the output is increased.

Figure 11:
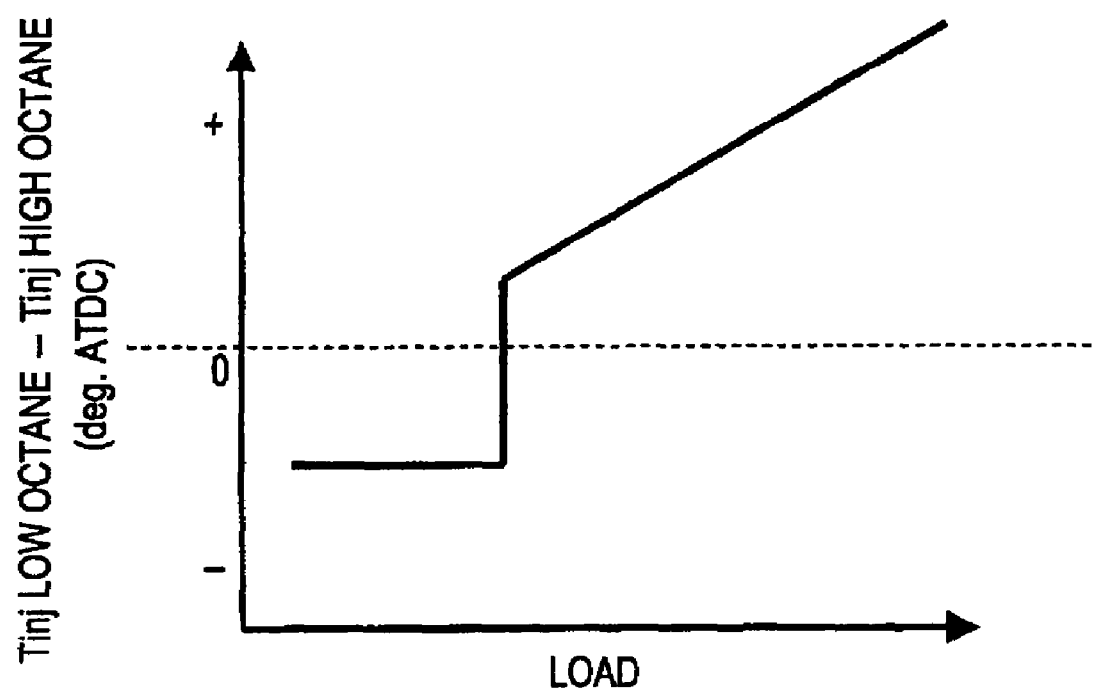
FIG. 11 is a graph showing the relationship between the engine load and the difference between fuel injection start timings.

FIG. 11 shows the relationship between the engine load (i.e. Load) and the difference $\Delta T$ in fuel injection start timing (i.e. low-octane fuel injection start timing "Tinj LOW OCTANE"—high-octane fuel injection stat timing "Tinj HIGH OCTANE").

As shown in FIG. 11, in a low load region in which low-octane fuel is injected earlier, $\Delta T$ is kept substantially constant. In a high load region in which low-octane fuel is injected later, control is exerted so that $\Delta T$ increases as the load increases. This is to ensure sufficient time for injection of high-octane fuel to be completed.

According to the first embodiment, combustion can be performed in accordance with the load by utilizing low-octane fuel (high-cetane fuel) having a high self-ignitability, and high-octane fuel having a low self-ignitability.

Accordingly, combustion can be achieved while reducing the amount of HC emission during a low-load operation, and the internal combustion engine can provide high output during a high-load operation.

Under a predetermined first operating condition (e.g. when the load is low or the engine speed is low), low-octane fuel is injected earlier than high-octane fuel so as to form an ignition flame of the low-octane fuel in the combustion chamber, and high-octane fuel is then injected toward the ignition flame so as to cause flame propagation and combustion of the high-octane fuel. Subsequently, the supply velocity and the combustion velocity of the high-octane fuel are balanced in order for the flame to stand still in the combustion chamber (i.e. standing combustion).

Consequently, combustion can be controlled by the supply velocity of the air-fuel mixture, and can be performed so that the injection period and the combustion period are substantially equal to each other. Further, since the formed air-fuel mixture is burned immediately, an unburnt mixture is not formed, and the amount of HC emission can be reduced.

Since the high-octane fuel having a low self-ignitability is used, self-ignition of a high-concentration fuel that is caused in diesel combustion is suppressed, and the increase of NOx is prevented.

The cavity is provided on the crown surface of the piston, and the low-octane fuel is injected so that it can collide with the cavity. Therefore, the position where the ignition flame of low-octane fuel is formed can be determined by the cavity. By being charged into the ignition flame, the high-octane fuel is burned reliably.

Since the injection rate of the low-octane fuel is set to be lower than that of the high-octane fuel, the injection amount of low-octane fuel is small. Therefore, the size of the cavity can be reduced. As a result, it is possible to suppress adhesion of fuel onto the cavity wall, an increase of smoke due to an excessively dense air-fuel mixture, and consumption of the low-octane fuel. Further, since the capacity of the cavity is small, the S/V ratio is increased, and cooling loss is reduced.

Since a substantially fixed difference is ensured between the injection start timing of the low-octane fuel and the injection start timing of the high-octane fuel, injection of the high-octane fuel can be controlled easily. In this case, the flame does not stay at one position, but moves according to the engine operating condition. However, this does not cause a problem as long as the flame does not contact the fuel injection valve or the crown surface of the piston.

Under a predetermined second condition (e.g. when the load is high or the engine speed is high), low-octane fuel is injected later than high-octane fuel, and flame propagation and combustion of the high-octane fuel are provided by self-ignition combustion of the low-octane fuel. Therefore, combustion can be performed more slowly and with less noise than homogeneous charge compression-ignition combustion.

When the load is high, or the engine speed is high, the injection start timing of the high-octane fuel is advanced as the load, or the engine speed, increases. Since the fuel injection amount increases with the increase in load, the high-octane fuel can be widely and uniformly distributed in the cylinder, and driving can be performed while reducing emission of soot and NOx. In a high-speed region, it is possible to cope with the increase in crank angle required for fuel injection. In contrast, by retarding the injection timing as the load decreases, the high-octane fuel can be stratified. Accordingly, combustion can be performed without pumping loss.

Injection of one of the low-octane fuel and the high-octane fuel is successively followed by injection of the other fuel. This can prevent the two kinds of fuels from being mixed more than necessary.

The single fuel injection valve capable of injecting both low-octane fuel and high-octane fuel is used for the fuel supply. That is, fuel injection is performed with the single fuel injection valve. Therefore, the fuels can be easily injected in the same direction, and, under a low-load operating condition, high-octane fuel can be reliably supplied to a high-temperature region formed by combustion of low-octane fuel injected earlier. Further, since the fuel injection valve is disposed at almost the center of the head of the combustion chamber, combustion of high-octane fuel supplied earlier under a high-load operating condition can be started from the center of the combustion chamber. Moreover, the use of the single fuel injection valve allows the internal combustion engine to have a smaller size, and achieves a highly efficient and clean low-load operation and a high-output high-load operation.

The single fuel injection valve includes two fuel pipes, that is, the low-octane fuel pipe and the high-octane fuel pipe. Further, at least the low-octane fuel pipe has the control valve whose opening and closing timing is controllable, and injection of the low-octane fuel is controlled by controlling the control valve. Therefore, switching between the low-octane fuel and the high-octane fuel supplied from their respective tanks is made in the fuel injection valve. This allows easy switching of fuel injection. Two control valves can be used, or a control valve can be provided only in the low-octane fuel pipe. This is because it is necessary to more precisely control the injection timing of the low-octane fuel.

A second embodiment of the present invention will now be described.

Figure 12:
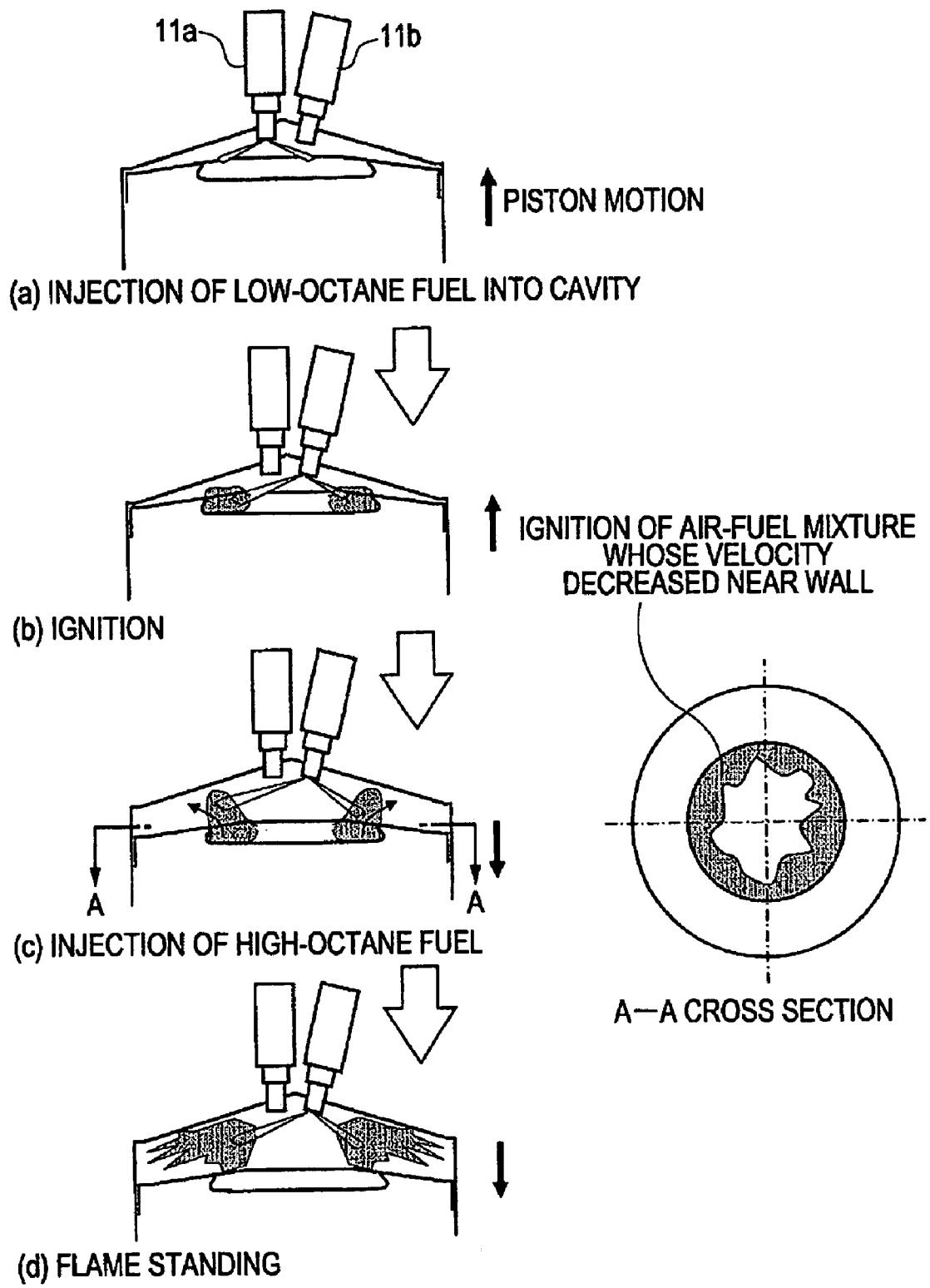
FIGS. 12A to 12D are schematic views showing formation and combustion of an air-fuel mixture according to a second embodiment.

FIG. 12 shows a configuration according to the second embodiment. In contrast to the first embodiment, a low-octane fuel injection valve 11a for injecting low-octane fuel, and a high-octane fuel injection valve 11b for injecting high-octane fuel, are provided separately. Both the fuel injection valves 11a and 11b are disposed at almost the center of an upper part of a combustion chamber (i.e. at the head center of the combustion chamber) so that fuels are injected in almost the same direction. This combustion manner can provide the same advantages as those of the first embodiment.

According to the second embodiment, the low-octane fuel injection valve 11a and the high-octane fuel injection valve 11b are separately provided for fuel supply. Therefore, the present invention can be carried out at low cost by using existing fuel injection valves.

Further, both the low-octane fuel injection valve 11a and the high-octane fuel injection valve 11b are disposed at almost the center of the upper part of the combustion chamber so as to inject the fuels in almost the same direction. Consequently, the high-octane fuel can be reliably supplied to a high-temperature region formed by combustion of the low-octane fuel injected earlier under a low-load operating condition. This permits standing combustion.

A third embodiment of the present invention will now be described.

Figure 13:
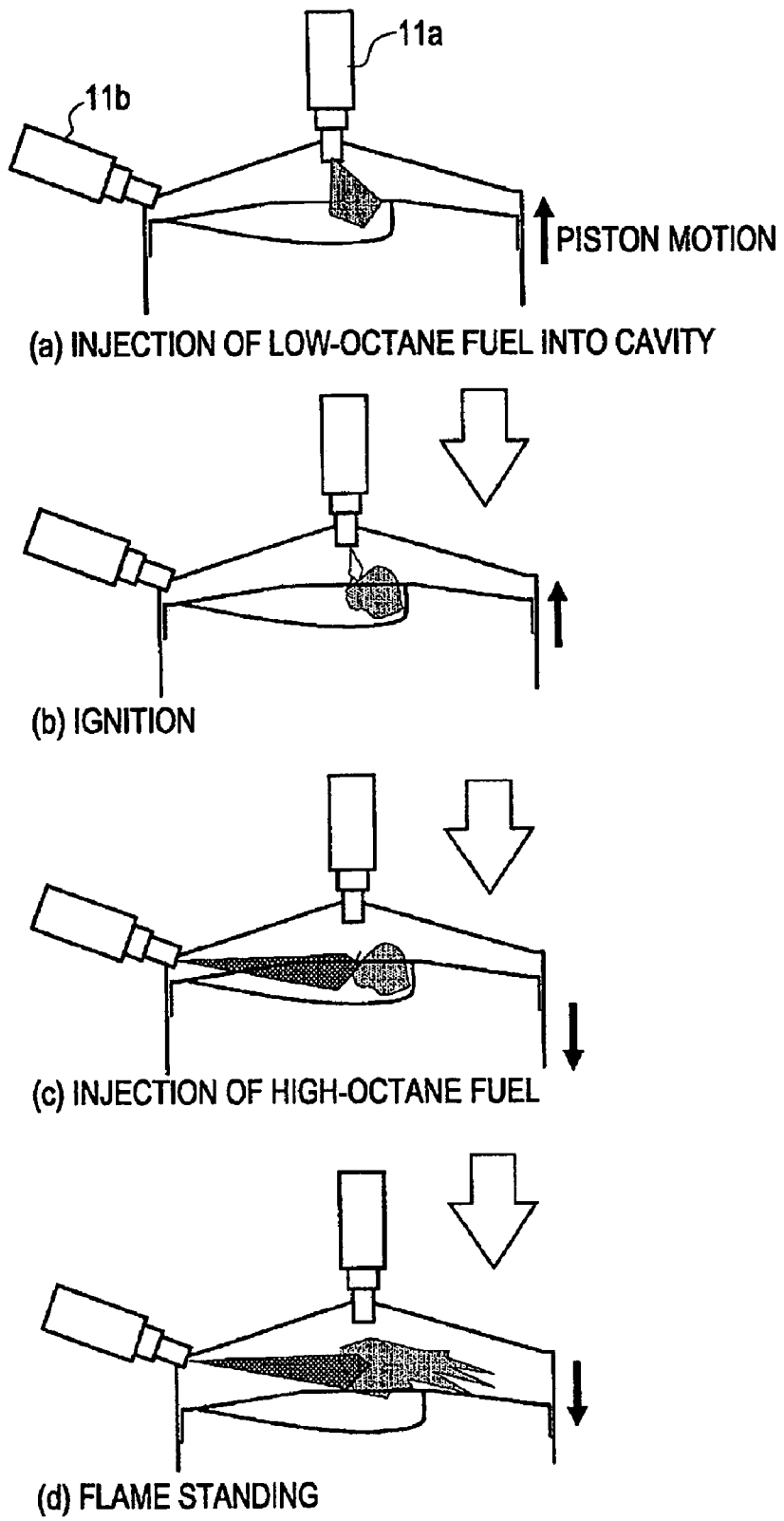
FIGS. 13A to 13D are schematic views showing formation and combustion of an air-fuel mixture according to a third embodiment.

FIG. 13 shows a configuration according to the third embodiment. Similarly to the second embodiment, a low-octane fuel injection valve 11a and a high-octane fuel injection valve 11b are provided separately. The third embodiment is different from the second embodiment in that the low-octane fuel injection valve 11a is disposed at almost the center of an upper part of a combustion chamber (i.e. at the head center of the combustion chamber), the high-octane fuel injection valve 11b is disposed in a peripheral portion of the combustion chamber (i.e. between a pair of intake ports), and the fuel injection valves 11a and 11b inject fuels toward the center of the combustion chamber.

Low-octane fuel is injected from the fuel injection valve 11a disposed at the head center of the combustion chamber, and is ignited in a piston cavity, thus forming a high-temperature field, as shown in FIGS. 13A and 13B. Subsequently, high-octane fuel is injected from the fuel injection valve 11b disposed in the peripheral portion of the combustion chamber, and is supplied into the high-temperature field formed by the low-octane fuel injected earlier, as shown in FIG. 13C. The flame thereby stands still near the center of the combustion chamber, as shown in FIG. 13D.

According to the third embodiment, by immediately burning the formed air-fuel mixture, spray combustion can be performed without forming an unburnt mixture, similar to the first embodiment.

Further, the low-octane fuel injection valve 11a is disposed at almost the center of the upper part of the combustion chamber, the high-octane fuel injection valve 11b is disposed in the peripheral portion of the combustion chamber, and both the fuel injection valves 11a and 11b inject the fuels toward the center of the combustion chamber. Therefore, under a low-load operating condition, the high-octane fuel can be supplied into a high-temperature region formed by combustion of the low-octane fuel injected earlier, and standing combustion can be achieved. In contrast, under a high-load operating condition, combustion of the high-octane fuel supplied earlier can be started from the center of the combustion chamber. This permits a highly efficient and clean low-load operation and a high-output high-load operation.

A fourth embodiment of the present invention will now be described.

Figure 14:
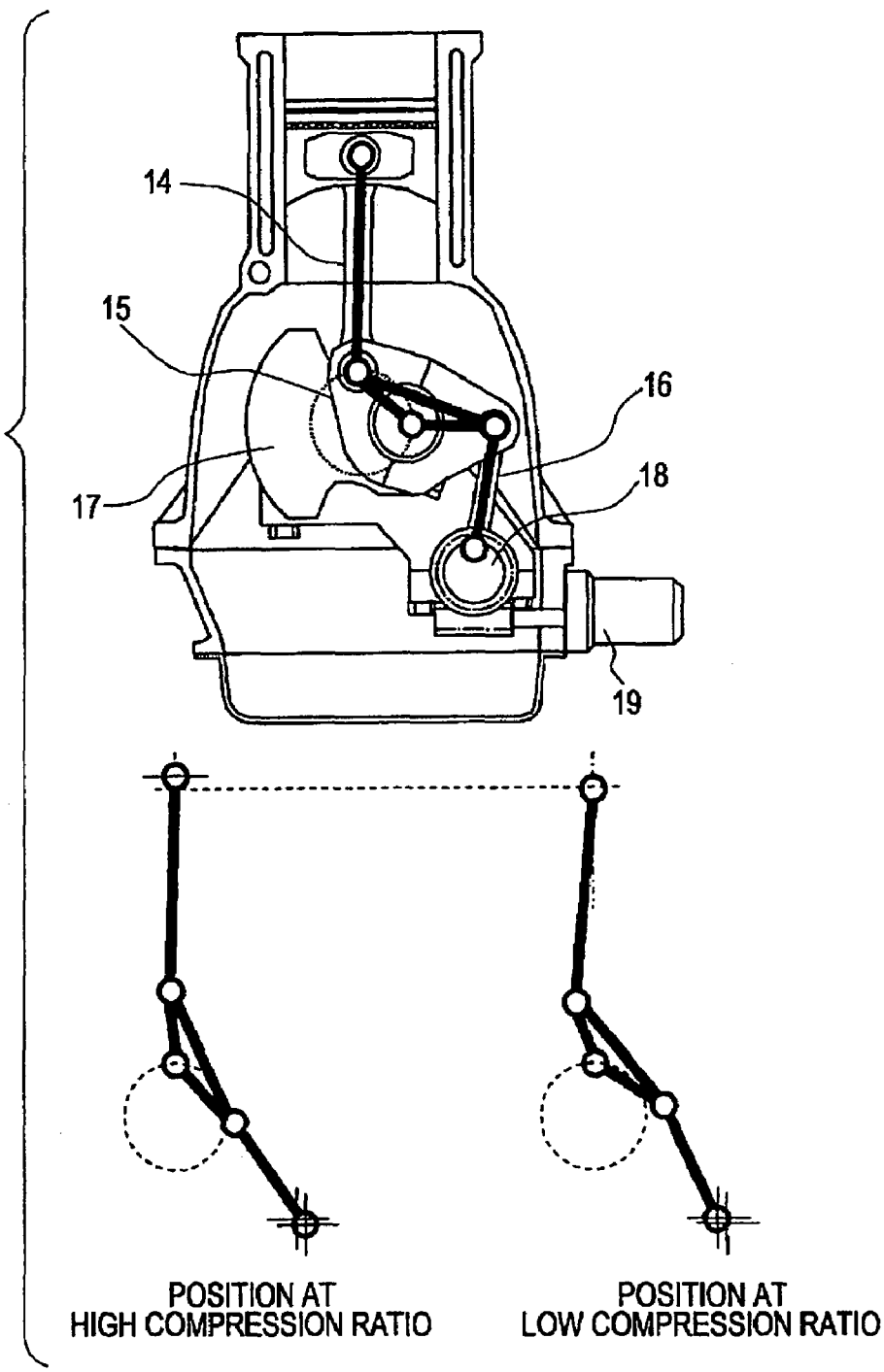
FIG. 14 is a view of a variable compression-ratio mechanism according to a fourth embodiment.

The fourth embodiment is characterized in a variable compression-ratio mechanism that can change the compression ratio of the engine, as shown in FIG. 14. The variable compression-ratio mechanism includes a first link 14, a second link 15, a third link 16, a crankshaft 17, a control shaft 18, and an actuator 19. The compression ratio of the engine is controlled by rotating the control shaft 18 by the actuator 19. Other structures in the fourth embodiment are the same as those adopted in the first embodiment, and therefore, descriptions thereof are omitted.

Figure 6:
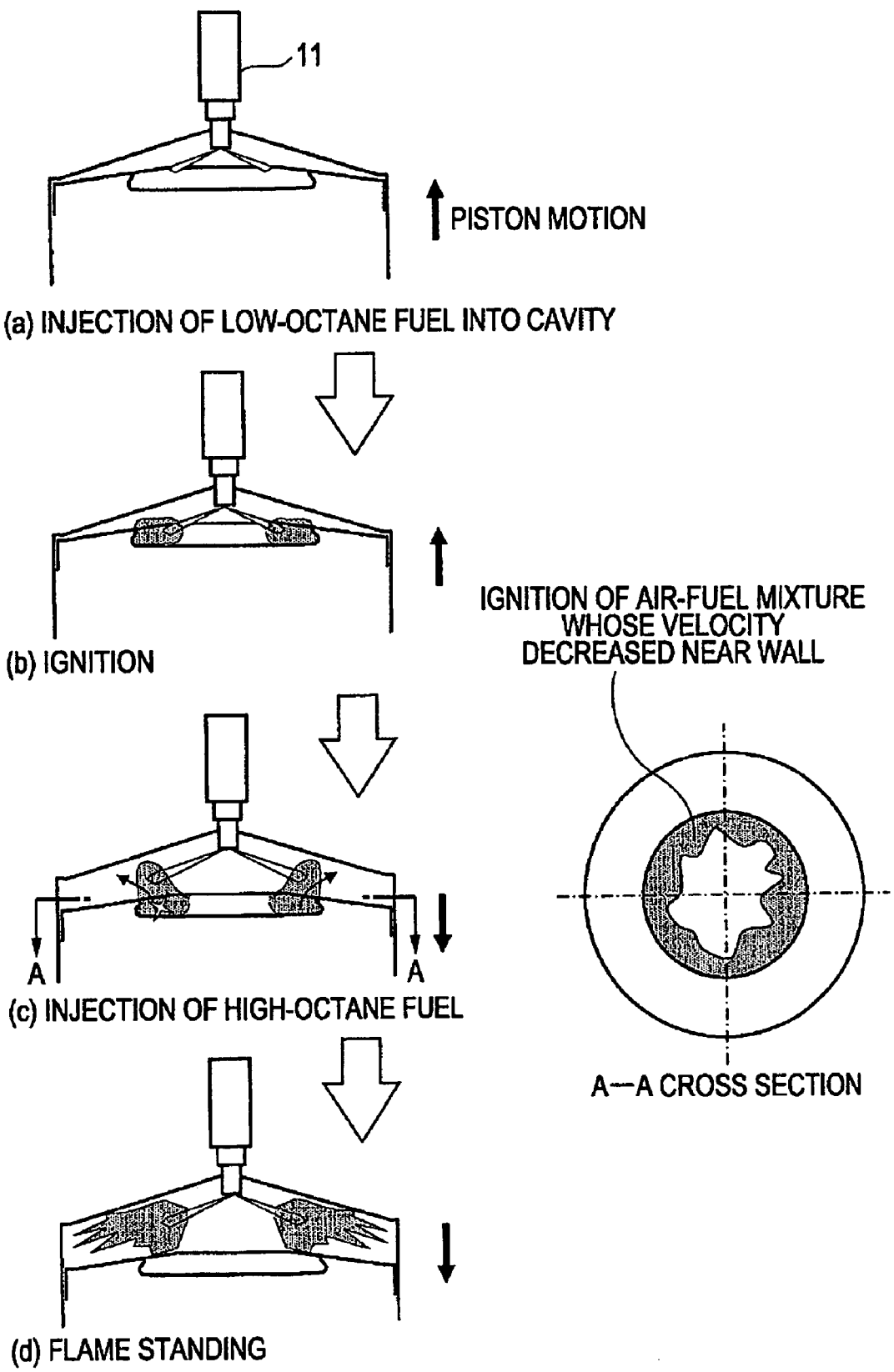
FIGS. 6A to 6D are schematic views showing formation and combustion of an air-fuel mixture.

The fourth embodiment adopts a first operation mode and a second operation mode. In the first operation mode, low-octane fuel is injected in the late stage of a compression stroke, and high-octane fuel is then injected in the early stage of an expansion stroke so that the flame stands still in a combustion chamber, as shown in FIG. 6. In contrast, in the second operation mode, low-octane fuel is injected after injection of high-octane fuel so as to cause flame propagation, as shown in FIG. 10. At least under a predetermined low-engine-speed or low-load operating condition, the first operation mode is selected.

The compression ratio of the engine in the first operation mode is set to be higher than in the second operation mode. This setting enhances thermal efficiency and increases the torque.

Since the optimum ignition timing is retarded by increasing the compression ratio, the torque is negligibly decreased even when the main combustion period is set during an expansion stroke after the piston starts to move down from the compression top dead center.

In normal combustion, knocking is caused by the increase in compression ratio, and this decreases the output. However, in the first operation mode, combustion can be achieved by spray combustion without causing knocking. Therefore, the torque is increased.

Since cooling loss is generally increased by the increase in compression ratio, the optimum ignition timing tends to be retarded. In the first operation mode, main fuel injection is performed from the late stage of the compression stroke to the expansion stroke, as shown in FIG. 6, and the heat-release peak is retarded. However, the decrease in thermal efficiency is suppressed by the above-described effect obtained by retardation of the optimum ignition timing with the increase in compression ratio.

Figure 15:
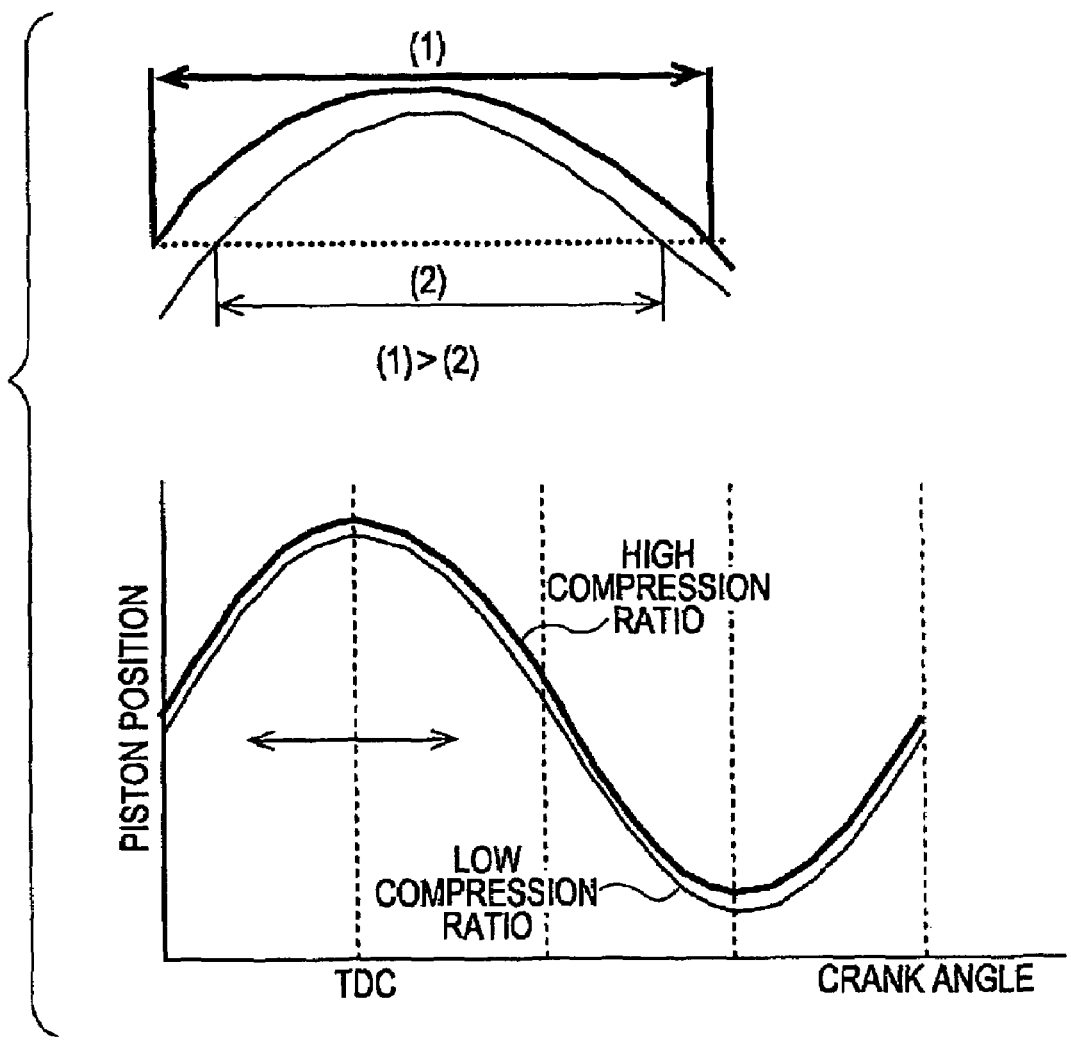
FIG. 15 is an explanatory view showing the piston stroke characteristics provided when the compression ratio is high and low.

FIG. 15 shows the piston stroke characteristics provided when the compression ratio is high and low in the fourth embodiment. When the compression ratio is high, the piston motion is set to be close to simple harmonic oscillation, and the piston stays near the top dead center for a longer period than when the compression ratio is low. Since the supply velocity and the combustion velocity of the air-fuel mixture are balanced in the first operation mode so that the flame stands still, the combustion period is controlled by the injection period. For this reason, if the total injection amount increases with the increase in load, the combustion period is prolonged and the degree of constant is decreased. However, thermal efficiency is not lowered even when the combustion period is long, because of the above-described effect of high compression ratio and a long stay of the piston near the compression top dead center.

Since the combustion period is controlled by the injection period in the first operation mode, it is prolonged as the engine speed of the combustion engine increases. As a result, the torque may be made lower than in the second operation mode. For this reason, the second operation mode is selected in a high-load and high-engine-speed range.

According to the fourth embodiment, the variable compression-ratio mechanism is provided to change the compression ratio of the engine, and, when the compression ratio is set to be high by the variable compression-ratio mechanism, the piston stays longer near the top dead center than when the compression ratio is low. Under the predetermined first operating condition in which low-octane fuel is injected earlier, when the load is low or the engine speed is low, a highly efficient operation can be achieved by setting a high engine compression ratio. In addition, since the piston stays long near the top dead center during low-load operation, a sufficient combustion period can be ensured. In contrast, during high-load operation in which low-octane fuel is injected later, self-ignition of end gas can be prevented by decreasing the engine compression ratio with the increase in load.

Figure 16:
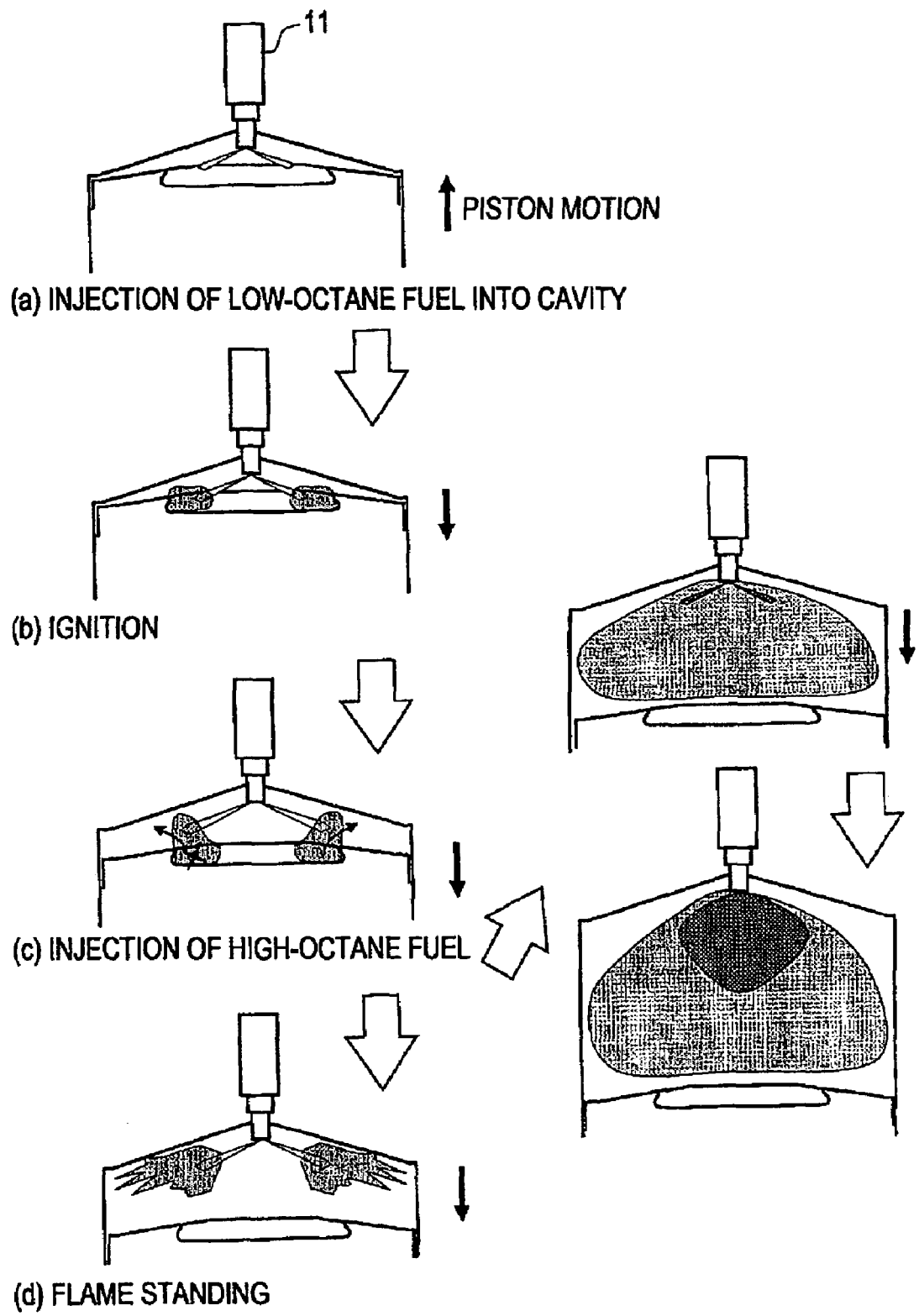
FIGS. 16A to 16D are schematic views showing formation and combustion of an air-fuel mixture according to a fifth embodiment.

A cold start in a fifth embodiment of the present invention will be described with reference to FIG. 16.

In the fifth embodiment, low-octane fuel is injected before and after injection of high-octane fuel.

Therefore, similarly to the first embodiment, high-octane fuel is charged into an ignition flame of low-octane fuel formed in the cavity, and fuel flow is ignited substantially simultaneously. Combustion flames formed of the main spray immediately burn a formed air-fuel mixture, and stand still in the combustion chamber.

At cold start, there is a need to quickly increase the temperature of a catalyst. Therefore, it is effective to make the combustion timing later than the normal combustion timing. This combustion manner of the fifth embodiment allows an air-fuel mixture to be immediately burned and stand still. Therefore, stable flames can be formed even when combustion is retarded.

By further injecting low-octane fuel after injection of the high-octane fuel, the temperature in the combustion chamber will increase. Moreover, since self-ignitability of the low-octane fuel is high, combustion can be performed without emission of unburnt hydrocarbon, in contrast to the high-octane fuel.

According to the fifth embodiment, under a predetermined third operating condition (e.g. at cool start), low-octane fuel is injected before and after injection of high-octane fuel. Therefore, main combustion can be stably started by the low-octane fuel injected earlier than the high-octane fuel. Since there is a need to quickly increase the temperature of a catalyst at cool start, the exhaust gas temperature needs to increase. By further injecting low-octane fuel after injection of the high-octane fuel, combustion can be performed with little unburnt fuel and the exhaust gas temperature can be increased even at a relatively later timing, because the low-octane fuel has a high self-ignitability.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A cylinder direct injection type internal combustion engine, comprising:
   a fuel injection device configured to directly inject a first octane-value fuel and a second octane-value fuel into a combustion chamber, the second octane-value fuel having an octane value larger than an octane value of the first octane-value fuel; and
   a controller programmed to perform a first operation mode, wherein, in the first operation mode, the first octane-value fuel is injected from the fuel injection device, and the second octane-value fuel is injected from the fuel injection device toward an ignition flame formed by self-ignition combustion of the first octane-value fuel, so as to cause flame propagation and combustion of the second octane-value fuel.

2. The cylinder direct injection type internal combustion engine according to claim 1, further comprising:
   a piston having a cavity,
   wherein the controller is programmed to control a fuel injection timing of the first octane-value fuel so that the first octane-value fuel is injected into the cavity.

3. The cylinder direct injection type internal combustion engine according to claim 1, wherein the injection amount of the first octane-value fuel and the injection amount of the second octane-value fuel are controlled so that the injection rate of the first octane-value fuel is lower than the injection rate of the second octane-value fuel.

4. The cylinder direct injection type internal combustion engine according to claim 1, wherein the injection timing of the first octane-value fuel and the injection timing of the second octane-value fuel are controlled so that a difference between the injection start timing of the first octane-value fuel and the injection start timing of the second octane-value fuel is substantially fixed when a load state of the internal combustion engine changes.

5. The cylinder direct injection type internal combustion engine according to claim 1,
wherein an operation state of the internal combustion engine is detected, and
wherein the first operation mode is performed when the internal combustion engine is in a low-load operation state or a low-engine-speed operation state.

6. The cylinder direct injection type internal combustion engine according to claim 1,
wherein an operation state of the internal combustion engine is detected,
wherein a second operation mode for controlling the fuel injection device is performed so that the second octane-value fuel is injected from the fuel injection device to form a combustible air-fuel mixture of the second octane-value fuel, so that the first octane-value fuel is injected from the fuel injection device toward the combustible air-fuel mixture of the second octane-value fuel so as to cause self-ignition combustion of the first octane-value fuel, and so that flame propagation and combustion of the second octane-value fuel is caused by the self-ignition combustion of the first octane-value fuel, and
wherein the first operation mode and the second operation mode are switched in accordance with the operation state of the internal combustion engine.

7. The cylinder direct injection type internal combustion engine according to claim 6, wherein the first operation mode is performed when the internal combustion engine is operated in a low-load operation state or a low-engine-speed operation state, and the second operation mode is performed when the internal combustion engine is operated in a high-load operation state or a high-engine-speed operation state.

8. The cylinder direct injection type internal combustion engine according to claim 6, the engine further comprising:
a variable compression-ratio mechanism configured to change the compression ratio of the engine,
wherein the controller is programmed to control the variable compression-ratio mechanism so that the compression ratio of the internal combustion engine in the first operation mode is higher than the compression ratio in the second operation mode.

9. The cylinder direct injection type internal combustion engine according to claim 6, wherein the injection timing of the second octane-value fuel is controlled in the second operation mode so that the injection start timing of the second octane-value fuel is advanced as the load or engine speed increases.

10. The cylinder direct injection type internal combustion engine according to claim 6,
wherein a third operation mode for controlling the fuel injection device is performed so that the first octane-value fuel is injected from the fuel injection device to form an ignition flame in the combustion chamber by self-ignition combustion of the first octane-value fuel, so that the second octane-value fuel is injected from the fuel injection device toward the ignition flame of the first octane-value fuel so as to cause flame propagation and combustion of the second octane-value fuel, and so that the first octane-value fuel is again injected from the fuel injection device after the second octane-value fuel is injected, and
wherein the third operation mode is performed when the internal combustion engine is in a cold start state.

11. The cylinder direct injection type internal combustion engine according to claim 1,
wherein the fuel injection device includes a fuel injection valve, a first octane-value fuel pipe configured to supply the first octane-value fuel to the fuel injection valve, a second octane-value fuel pipe configured to supply the second octane-value fuel to the fuel injection valve, and a control valve provided in the first octane-value fuel pipe and configured to control the supply of the first octane-value fuel to the fuel injection valve, and
wherein the controller is programmed to control the control valve so that the first octane-value fuel is injected from the fuel injection valve.

12. The cylinder direct injection type internal combustion engine according to claim 1, wherein the fuel injection device includes a fuel injection valve, the fuel injection valve is disposed at the center of an upper part of the combustion chamber.

13. The cylinder direct injection type internal combustion engine according to claim 1, wherein the fuel injection device includes a fuel injection valve, the fuel injection valve includes a first octane-value fuel injection valve configured to inject the first octane-value fuel, and a second octane-value fuel injection valve configured to inject the second octane-value fuel.

14. The cylinder direct injection type internal combustion engine according to claim 13, wherein the first octane-value fuel injection valve is disposed at the center of an upper part of the combustion chamber, and the second octane-value fuel injection valve is disposed on a periphery of the combustion chamber.

15. A fuel injection control method for a cylinder direct injection type internal combustion engine, the engine including a fuel injection device configured to directly inject a first octane-value fuel and a second octane-value fuel into a combustion chamber, the method comprising:
injecting the first octane-value fuel from the fuel injection device;
forming an ignition flame in the combustion chamber by self-ignition combustion of the first octane-value fuel;
injecting the second octane-value fuel from the fuel injection device toward the ignition flame of the first octane-value fuel; and
causing flame propagation and combustion of the second octane-value fuel.

16. A cylinder direct injection type internal combustion engine, comprising:
means for directly injecting a first octane-value fuel and a second octane-value fuel into a combustion chamber;
means for injecting the first octane-value fuel so that an ignition flame is formed in the combustion chamber by self-ignition combustion of the first octane-value fuel; and
means for injecting the second octane-value fuel toward the ignition flame of the first octane-value fuel so as to cause flame propagation and combustion of the second octane-value fuel.

* * * * *